US009768478B2

United States Patent
Wang et al.

(10) Patent No.: US 9,768,478 B2
(45) Date of Patent: Sep. 19, 2017

(54) TRACTION BATTERY ASSEMBLY

(71) Applicant: Ford Global Technologies, LLC, Dearborn, MI (US)

(72) Inventors: LeeAnn Wang, Canton, MI (US); George Albert Garfinkel, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 6 days.

(21) Appl. No.: 14/694,018

(22) Filed: Apr. 23, 2015

(65) Prior Publication Data

US 2016/0315366 A1    Oct. 27, 2016

(51) Int. Cl.
| | |
|---|---|
| *H01M 10/6566* | (2014.01) |
| *H01M 10/625* | (2014.01) |
| *H01M 10/613* | (2014.01) |
| *B60L 11/18* | (2006.01) |
| *H01M 2/10* | (2006.01) |
| *H01M 10/647* | (2014.01) |
| *H01M 10/6557* | (2014.01) |
| *H01M 10/6555* | (2014.01) |
| *H01M 10/6561* | (2014.01) |

(52) U.S. Cl.
CPC ..... *H01M 10/6566* (2015.04); *B60L 11/1874* (2013.01); *H01M 2/1077* (2013.01); *H01M 10/613* (2015.04); *H01M 10/625* (2015.04); *H01M 10/647* (2015.04); *H01M 10/6555* (2015.04); *H01M 10/6557* (2015.04); *H01M 10/6561* (2015.04); *H01M 2220/20* (2013.01)

(58) Field of Classification Search
CPC ........... H01M 10/6566; H01M 10/625; H01M 10/613; H01M 10/647; H01M 10/6557; H01M 10/6555; H01M 10/6561; H01M 2220/20; H01M 2/1077; B60L 11/1874
See application file for complete search history.

(56) References Cited

U.S. PATENT DOCUMENTS

| | | | |
|---|---|---|---|
| 4,522,898 A * | 6/1985 | Esrom ................ | B60L 11/1875 429/120 |
| 8,105,708 B2 | 1/2012 | Rudorff et al. | |
| 8,945,746 B2 | 2/2015 | Kwag et al. | |
| 2006/0091856 A1* | 5/2006 | Lee .................... | H01M 2/1077 320/116 |

(Continued)

*Primary Examiner* — Emily Le
*Assistant Examiner* — Lilia V Nedialkova
(74) *Attorney, Agent, or Firm* — David Kelley; Brooks Kushman, P.C.

(57) ABSTRACT

A battery assembly includes a plurality of battery cells arranged in an array. The array has first and second longitudinal sides and a plurality of spacers interleaved with the cells to create an air gap between adjacent cells to allow air circulation between the cells. An inlet manifold is disposed on the first longitudinal side and includes an inlet arranged such that air flows into the manifold in a direction substantially parallel to the first longitudinal side. A plate is disposed within the manifold and extends along the first longitudinal side. The plate has a proximal end near the inlet and a distal end. The plate has openings that each define a pass-through area that allows the air to circulate through the plate. The openings are arranged on the plate such that the plate has a larger pass-through area near the proximal end than near the distal end.

7 Claims, 4 Drawing Sheets

(56) References Cited

U.S. PATENT DOCUMENTS

| | | | |
|---|---|---|---|
| 2009/0141447 A1* | 6/2009 | Soma | B60K 6/445 |
| | | | 361/694 |
| 2012/0231314 A1 | 9/2012 | Sohn | |
| 2013/0095359 A1* | 4/2013 | Yoshioka | H01M 2/1016 |
| | | | 429/99 |
| 2014/0138042 A1 | 5/2014 | Yagi et al. | |
| 2015/0023392 A1 | 1/2015 | Noh | |

* cited by examiner

TRACTION BATTERY ASSEMBLY

TECHNICAL FIELD

The present disclosure relates to traction battery assemblies for motor vehicles, and particularly to air-cooled fraction batteries.

BACKGROUND

Vehicles such as battery-electric vehicles and hybrid-electric vehicles contain a traction battery assembly to act as an energy source for the vehicle. The traction battery may include components and systems to assist in managing vehicle performance and operations. The traction battery may also include high voltage components, and may include an air or liquid thermal-management system to control the temperature of the battery.

SUMMARY

According to one embodiment, a battery assembly includes a plurality of battery cells arranged in an array. The array has first and second longitudinal sides and a plurality of spacers interleaved with the cells to create an air gap between adjacent cells to allow air circulation between the cells. An inlet manifold is disposed on the first longitudinal side and includes an inlet arranged such that air flows into the manifold in a direction substantially parallel to the first longitudinal side. A plate is disposed within the manifold and extends along the first longitudinal side. The plate has a proximal end near the inlet and a distal end. The plate has openings that each define a pass-through area that allows the air to circulate through the plate. The openings are arranged on the plate such that the plate has a larger pass-through area near the proximal end than near the distal end.

According to another embodiment, a battery assembly includes an array of stacked battery cells having a longitudinal side and a manifold adjacent the side. The manifold includes a port arranged such that air flows through the port in a direction substantially parallel to the side. A plate is disposed between the array and the port, and is substantially parallel to the side. The plate has holes that are greater in number near the port than near an end distal to the port.

According to yet another embodiment, a battery assembly includes an array of stacked battery cells having a longitudinal side. A manifold is adjacent to the side and includes a port arranged such that air flows through the port in a direction substantially parallel to the side. A plate is disposed between the array and the port and is substantially parallel to the side. The plate has holes arranged such that, for a given period of time, more air passes through the plate near the port than near an end of the plate distal to the port.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
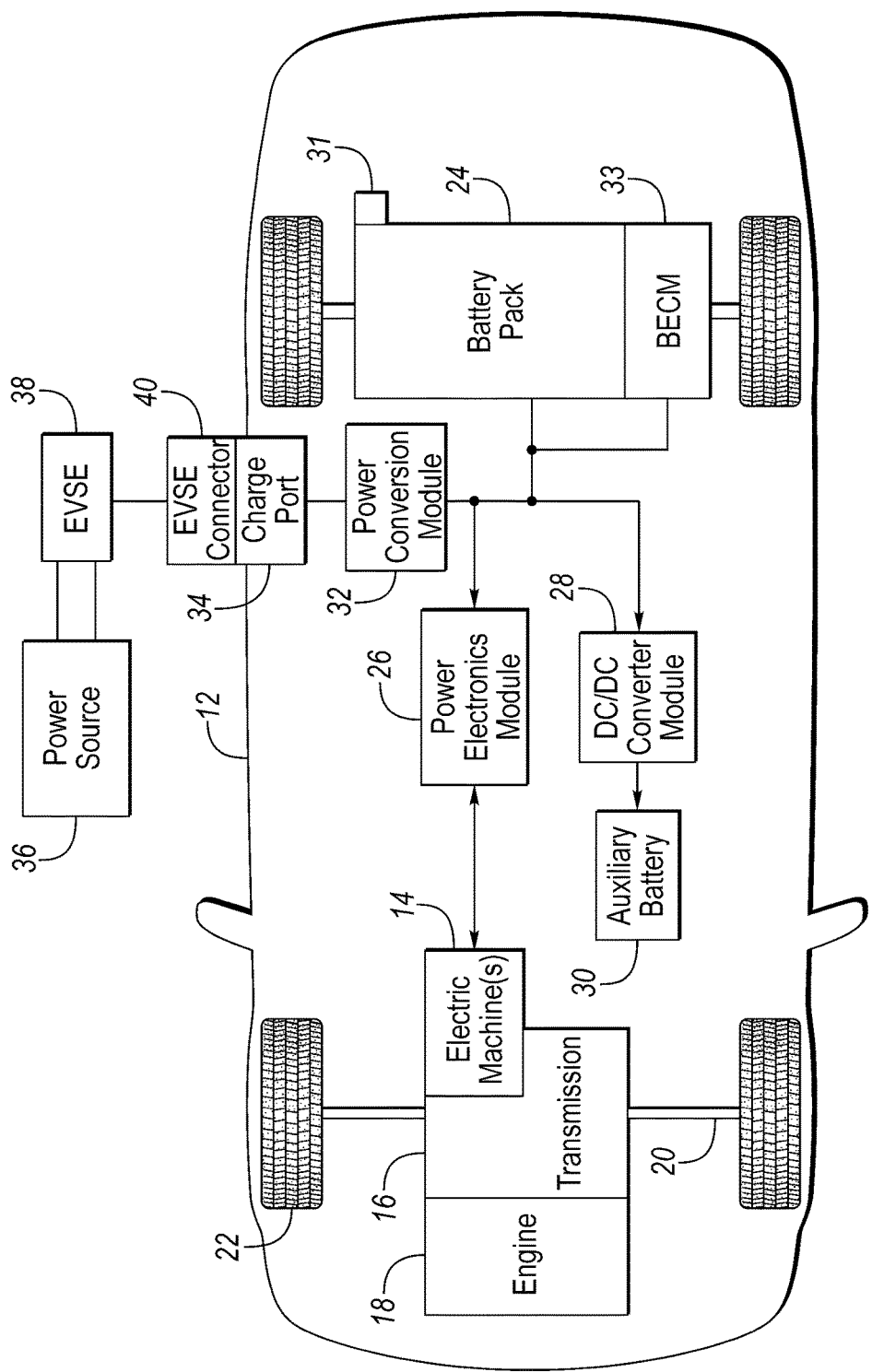
FIG. 1 is a schematic diagram of an example hybrid vehicle.

FIG. 1 depicts a schematic of a typical plug-in hybrid-electric vehicle (PHEV). Certain embodiments, however, may also be implemented within the context of non-plug-in hybrids and fully-electric vehicles. The vehicle 12 includes one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy through regenerative braking The electric machines 14 reduce pollutant emissions and increase fuel economy by reducing the work load of the engine 18.

A traction battery or battery pack 24 stores energy that can be used by the electric machines 14. The traction battery 24 typically provides a high voltage direct current (DC) output from one or more battery cell arrays, sometimes referred to as battery cell stacks, within the traction battery 24. The battery cell arrays may include one or more battery cells.

The battery cells, such as a prismatic, pouch, cylindrical, or any other type of cell, convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle.

Different battery pack configurations may be available to address individual vehicle variables including packaging constraints and power requirements. The battery cells may be thermally regulated with a thermal management system. Examples of thermal management systems include air cooling systems, liquid cooling systems and a combination of air and liquid systems.

The traction battery 24 may be electrically connected to one or more power electronics modules 26 through one or more contactors (not shown). The one or more contactors isolate the traction battery 24 from other components when opened and connect the traction battery 24 to other components when closed. The power electronics module 26 may be electrically connected to the electric machines 14 and may provide the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a fully-electric vehicle. In a fully-electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle components. Other high-voltage loads, such as compressors and electric heaters, may be connected directly to the high-voltage supply without the use of a DC/DC converter module 28. In a typical vehicle, the low-voltage systems are electrically connected to an auxiliary battery 30 (e.g., a 12 volt battery).

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by an external power source 36. The external power source 36 is a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via dedicated electrical conduits.

Figure 2:
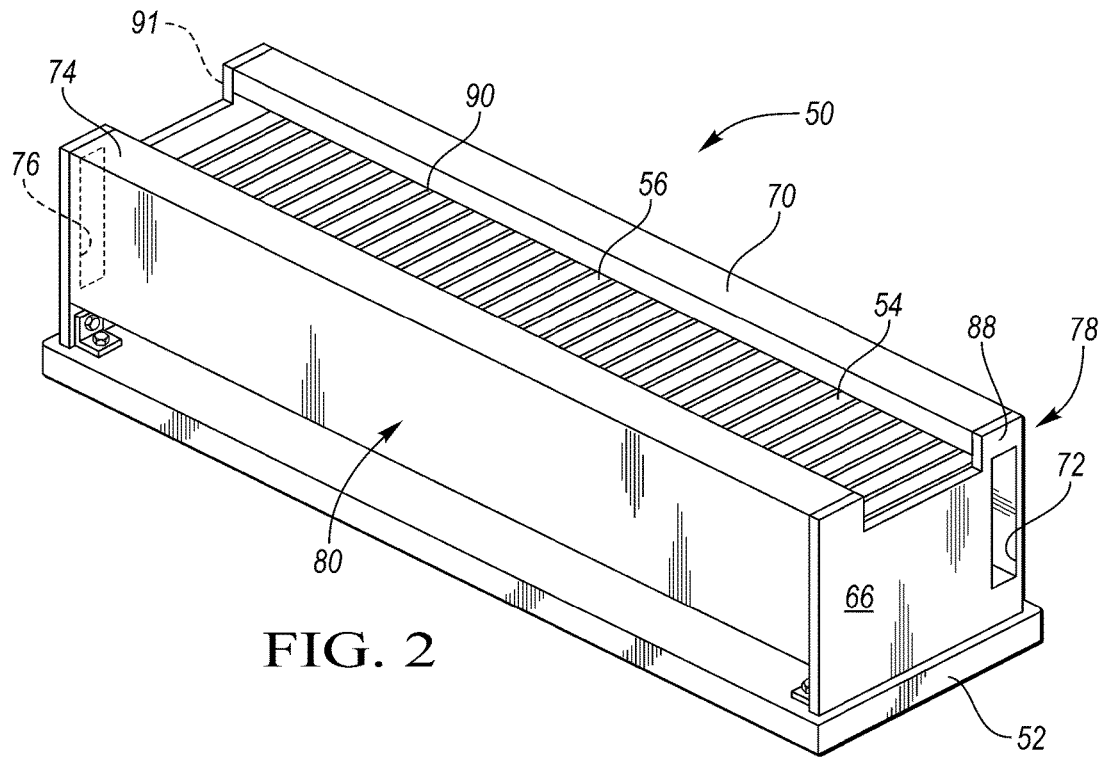
FIG. 2 is a perspective view of a traction battery assembly.
Figure 3:
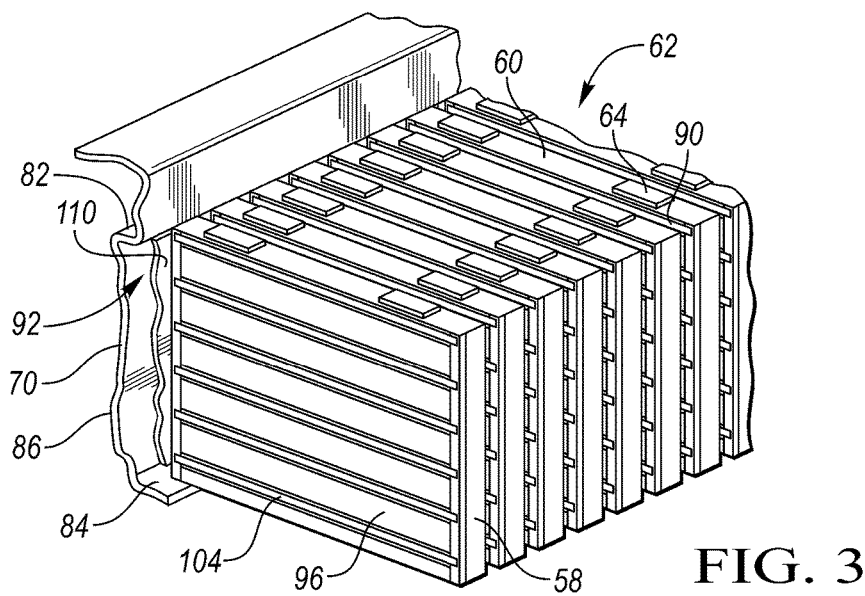
FIG. 3 is a perspective view of a portion of the array of FIG. 2.

FIGS. 2 through 5 and the related discussion describe examples of the traction battery assembly 24. Referring to FIGS. 2 and 3, a traction battery assembly 50 includes one or more battery arrays attached to a tray 52. For example, FIG. 2 illustrates an array 54 attached to the tray 52. Each array includes a plurality of battery cells 56 having major sides 96, which are the larger faces of the cell, and minor sides 58, which are the smaller faces of the cell. The number of cells 56 in the array 54 varies according to design constraints. The cells 56 are stacked in the array with the major sides 96 of adjacent cells facing each other. One of the minor sides 58 includes at least one terminal 64. This side is known as the terminal side 60 of the cell 56. The cells 56 may be arranged in the arrays such that all of the terminal sides 60 are on a same side of the array 54 and collectively define a terminal side 62 of the array 54. Select terminals 64 of the cells 56 are electrically connected with busbars (not shown). The busbars may be arranged to electrically connect the cells in series or parallel.

The array 54 may include a pair of endplates 66 disposed at each end of the array and sandwiching the cells 56 therebetween. The endplates 66 may apply compression to the cells. A plurality of rails or tension members may extend between the endplates 66. The tension members may be attached to each endplate 66 by fasteners or welding.

A plurality of spacers 90 are interleaved with the cells 56. The spacers 90 are mostly hollow and create an air gap between the major sides 96 of adjacent cells. During operation, relatively hot or cold air may be circulated through the air gaps to heat or cool the arrays. Each spacer 90 may include an outer frame having a top, a bottom, and sides. A plurality of horizontal members 104 extend between the sides and extend across the major sides 96 of the cells 56. Each spacer 90 also includes clips for attaching the spacers 90 to one or more cells.

The battery array 54 includes first and second longitudinal sides 78, 80 on opposite sides of the array 54. An inlet manifold 70 may be disposed against the first longitudinal side 78, and an outlet manifold 74 may be disposed against the second longitudinal side 80. The inlet manifold 70 may include a top 82, a bottom 84, and a side panel 86 cooperating to form a C-shaped housing. The manifold 70 may also include a front panel 88 attached to one end of the C-shaped housing, and a back panel 91 attached to the other end of the C-shaped housing. In some embodiments the front and back panels are integral with the endplates as illustrated in FIG. 2. In this embodiment, the manifold 70 defines an inner chamber 92 having an open side that faces the first longitudinal side 78 of the array 54. The outlet manifold 74 may include a housing similar to the inlet manifold 70.

The inlet manifold 70 includes an inlet 72 connected to an air circulation system (not shown). The air circulation system may include, a pump, conduit, valving and fittings. The inlet 72 may be defined in the front panel 88 or the back panel 91. During operation of the vehicle, the air circulation system selectively pumps air into the inner chamber 92 of the inlet manifold 70 via the inlet 72. The inlet 72 is arranged such that the air enters into the manifold 70 in a direction substantially parallel to the first longitudinal side 78. The air pressure within the inlet manifold 70 is higher than the outlet manifold 74, which causes the air to circulate from the inlet manifold 70 through the air gaps between each cell 56 and into the outlet manifold 74. The passing air extracts heat from the cells 56 to thermally regulate temperature of the cells. The outlet manifold 74 includes an outlet 76 that is also connected to the air circulation system. The outlet 76 may be arranged such that air exits the manifold 74 in a direction parallel to the second longitudinal side 80. The outlet 76 may be on the same end as inlet 72, or may be on an opposite end as shown.

Figure 4:
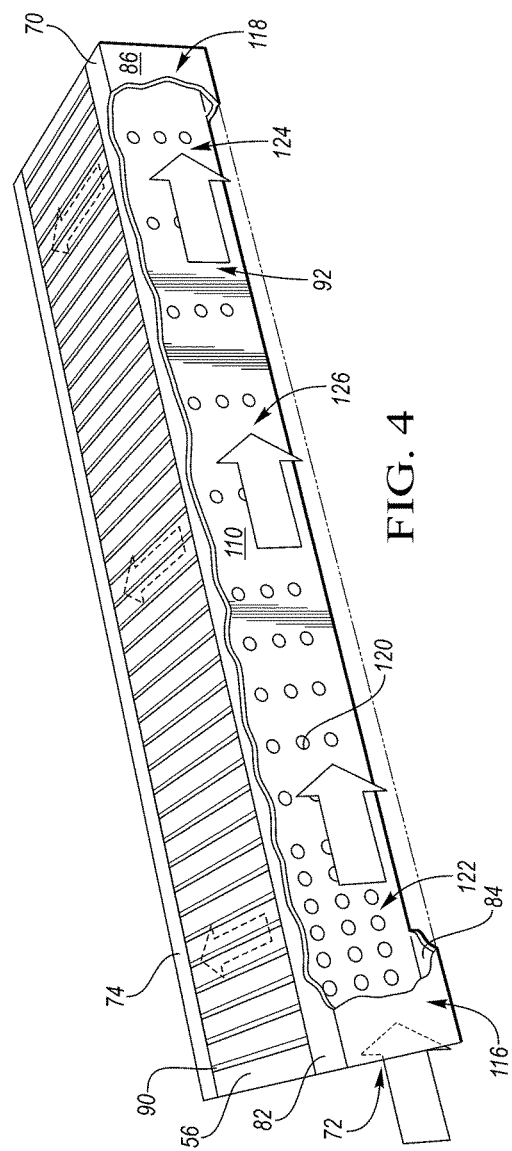
FIG. 4 is a fragmented perspective view of the traction battery assembly of FIG. 2 with ancillary components omitted.
Figure 5:
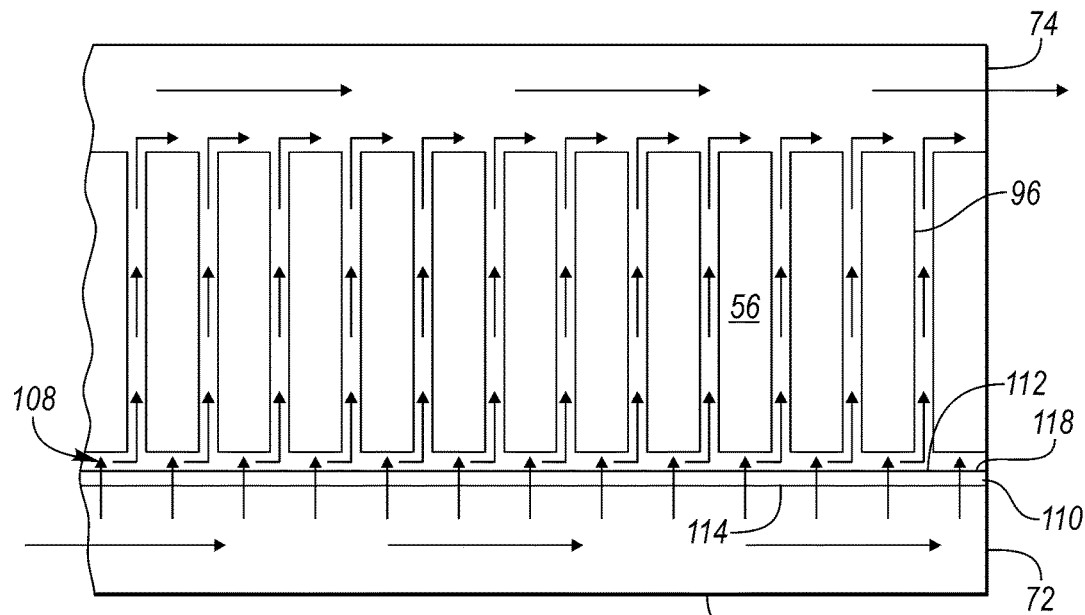
FIG. 5 is a diagrammatical top view of the traction battery assembly of FIG. 2 with the spacers and other ancillary components omitted.

Referring to FIGS. 4 and 5, a plate 110 may be disposed in or near the inlet manifold 70 or the outlet manifold 74. For example, the plate 110 is disposed in the inlet manifold 70 between the inlet 72 and the array 54. The plate 110 extends along the first longitudinal side 78 and includes a proximal end 116 near the inlet 72 and a distal end 118 near the back panel 91. The plate 110 may be substantially parallel to the first longitudinal side 78. The plate 110 includes an inner surface 112 facing the array 54, and an outer surface 114 facing the side panel 86 of the manifold 70. In some embodiments, the plate 110 is a separate component from the manifold and is connected to the manifold at one or more locations. Alternatively, the plate 110 is part of the manifold and forms an inner wall of the manifold. The plate 110 may be spaced apart from the array 54 to create an air pocket 108 between the first longitudinal side 78 and the plate 110.

The plate 110 may include a plurality of holes 120 that extend between the inner surface 112 and the outer surface 114. Each of the holes 120 has a cross-sectional area through which air may pass. The holes allow air within the manifold 70 to circulate through the plate 110 and into the array 54 to cool the cells 56. The holes 120 are arranged on the plate in a specific pattern to control the air pressure within the manifold, the flow rate of the air circulating through each spacer 90, and the uniformity of the flow through the array 54. A summation of the cross-sectional area of all of the holes is a total pass-through area of the plate 110. The plate 110 may be split up into regions, and a summation of the cross-sectional area of the holes located within each region is a regional pass-through area. The pass-through area of the different regions may vary to control the flow rates of the air passing through the array 54. For example, the plate 110 may include an entrance region 122 located near the inlet 72, and may include an end region 124 located near the distal end 118. The pass-through area of the entrance region 122 may be higher than the pass-through area of the end region 124. The plate 110 may also include a middle region 126 that has a lower pass-through area than the entrance region 122 and a higher pass-through area than the end region 124. Depending upon the embodiment, the plate may have dozens or hundreds of regions with different pass-through areas. The holes 120 may be round, square, or any other suitable shape. All of the holes 120 may have a same cross-sectional area, or may have different cross-sectional areas.

In one embodiment, the number of holes in each region is varied to create different pass-through areas in each region. Here, all of the holes 120 may have a same cross-sectional area. The holes 120 are arranged on the plate 110 such that the plate has a higher hole density near the proximal end 116 than near the distal end 118. The hole pattern may be arranged such that the hole density gradually decreases along the length of the plate 110 from the proximal end 116 to the distal end 118—as illustrated in FIG. 4. The gradual decrease may be linear or nonlinear. Each of the holes 120 may have a diameter between 2 millimeters (mm) and 30 mm inclusive.

Alternatively, the cross-sectional area (e.g. diameter) of the holes may vary, rather than the number, to achieve differential pass-through areas along the plate 110. For example, the holes near the proximal end 116 are larger than the holes near the distal end 118. In another embodiment, the plate 110 may not include holes; rather the plate is porous. The porosity of the plate may vary along its length to allow more air to pass through the proximal end 116 than the distal end 118.

Figure 6:
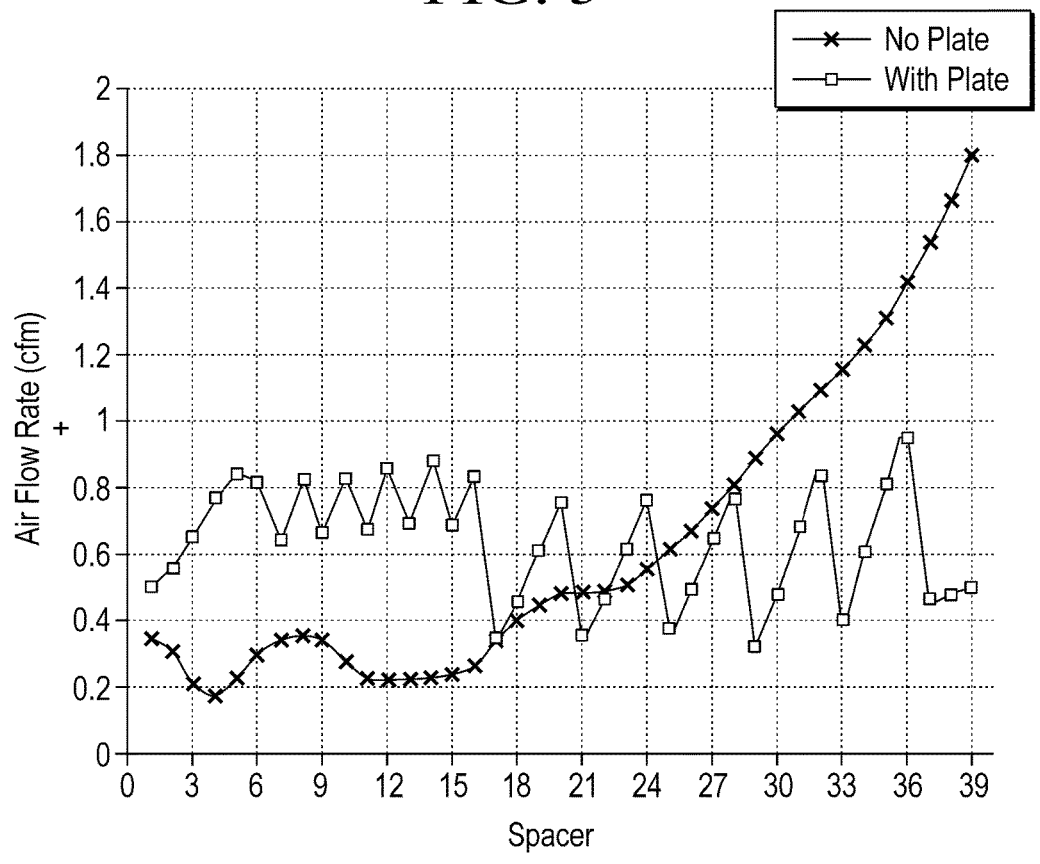
FIG. 6 is a graph illustrating the mass flow rates of two different traction battery assemblies.

Referring to FIG. 6, a graph of volumetric flow rates of the air at various spacer locations is illustrated. The graph shows the air flow rates for two different traction batteries. The line labeled "with plate" corresponds to a traction battery with the plate 110, and the line labeled "without plate" corresponds to a traction battery similar to this disclosure but not include the plate 110. Each of the traction batteries includes an air inlet arranged such that air flows into the manifold in a direction substantially parallel to the longitudinal axis of the array. The air inlet is positioned proximal to cell 1, and the end wall of the manifold cavity is positioned near cell 38. The y-axis indicates the flow rate of air circulating through the spacers in cubic feet per minute (cfm) and the x-axis is the location of the flow rate measured in cells spacers. For example, the flow rate of the air at spacer 3 of the with-plate battery is 0.68 cfm.

The no-plate battery assembly has inconsistent air flow rates across the array. Generally speaking, the flow rates near the inlet (i.e. spacers 1-21) are substantially less than the flow rates distal to the inlet (i.e. spacers 30-39). For example, the flow rate at cell 1 is 0.38 cfm and the flow rate at cell 39 is 1.81 cfm. These inconsistent flow rates cause spacers 1-21 to receive less circulating air than spacers 30-39 and, consequently, the cells associated with those spacers are hotter than the cells that receive more circulating air. The unequal cooling creates a temperature differential across the array, which is undesirable. The inconsistent flow rates are primarily due to the arrangement of the inlet relative to the array. Because the air is entering into the manifold in a direction substantially parallel to the longitudinal side of the array, the air tends to continue in a straight path until it reaches the end wall of the manifold; rather than turning and uniformly traveling through the gaps in the cells. This causes a high air flow rate through spacers nearer to the end wall than spacers nearer to the inlet.

The with-plate battery assembly has more consistent air flow rates across the array than the no-plate battery assembly. While there is variation spacer to spacer, one end of the array is not receiving substantially higher flow rates than the other end of the array. Thus, the with-plate battery assembly has a more uniform temperature distribution across the array. This is due, at least in part, to the addition of the plate 110. The hole patterns in the plate 110 are used to tune the pressure within the manifold. By providing a larger pass-through area near the inlet than near the end wall, higher pressure is developed in the manifold near the end wall causing more air to flow through spacers 1-21 than in the no-plate battery assembly. In alternative embodiments, the plate 110 may be disposed within the outlet manifold 74, in a manner similar to the inlet manifold 70.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A battery assembly comprising:
   a plurality of prismatic battery cells each including a pair of opposing major sides and minor sides extending therebetween, the battery cells being arranged in an array with at least one of the major sides facing another of the major sides, wherein the minor sides cooperate to define first and second longitudinal sides of the array;
   a plurality of spacers interleaved with the cells, each of the spacers including a frame disposed against at least two of the minor sides of a corresponding one of the cells and an elongate member extending between opposing portions of the frame and across one of the major sides of the corresponding cell to create an air gap between adjacent cells to allow air circulation between the cells;
   a pair of endplates sandwiching the array, one of the endplates defining an inlet port;
   an inlet manifold disposed on the first longitudinal side and extending between the pair of endplates, wherein the inlet manifold is aligned with the inlet port such that air flows into the manifold in a direction substantially parallel to the first longitudinal side; and
   a plate disposed within the manifold, extending along the first longitudinal side from a proximal end adjacent the inlet port on one of the endplates to a distal end adjacent the other of the endplates, and spaced apart from the first longitudinal side such that a distance between the plate and each of the minor sides is equal to define a plenum in fluid communication with the manifold and the air gaps, wherein the plate has openings that each define a pass-through area that allows the air to circulate through the plate and into the plenum, and wherein the openings are arranged on the plate such that the plate has a larger pass-through area near the proximal end than near the distal end.

2. The battery assembly of claim 1 wherein at least one of the openings is aligned with one of the minor sides.

3. The battery assembly of claim 1 wherein the plate includes a first side that defines an inner wall of the manifold and a second side that defines an outer wall of the plenum.

4. The battery assembly of claim 3 wherein the openings extend through the plate from the first side to the second side.

5. The battery assembly of claim 1 wherein each of the openings has a same pass-through area and wherein the openings are greater in number near the proximal end than near the distal end.

6. The battery assembly of claim 1 wherein, at the distal end, the number of air gaps exceeds the number of openings.

7. The battery assembly of claim 1 further comprising an outlet manifold disposed on the second longitudinal side.

* * * * *